No. 687,423. Patented Nov. 26, 1901.
W. H. DE WITT & C. SCUDDER.
OIL FILTER.
(Application filed Jan. 23, 1901.)
(No Model.)
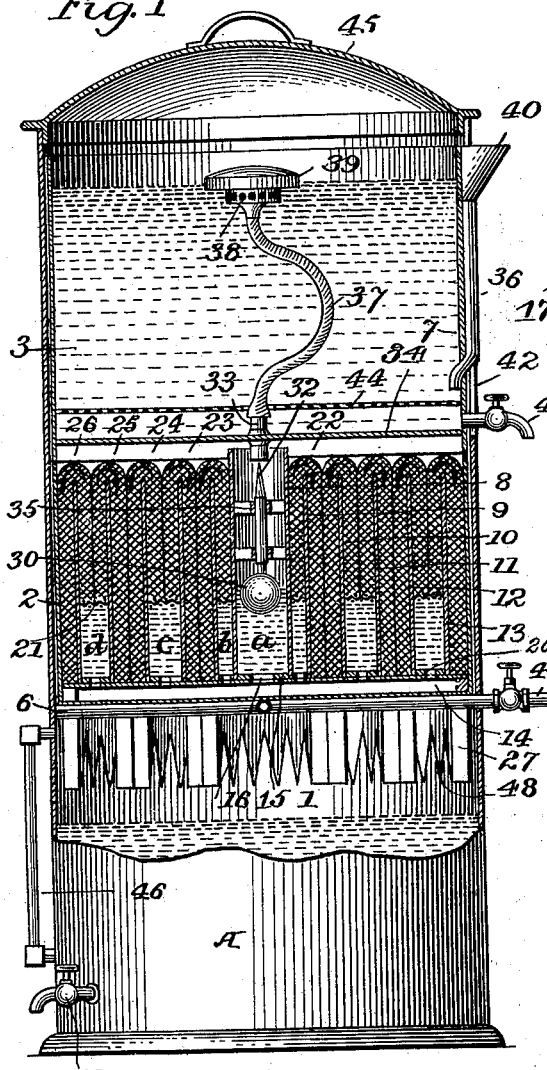
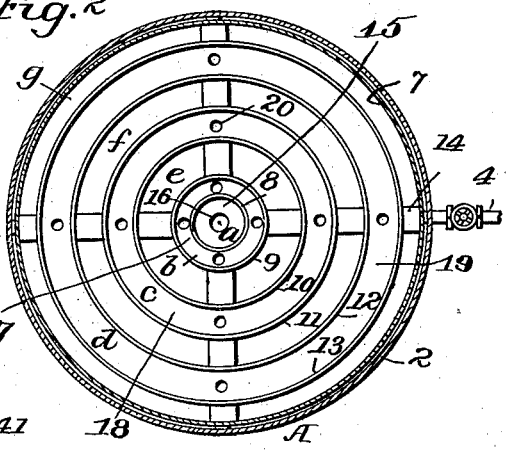
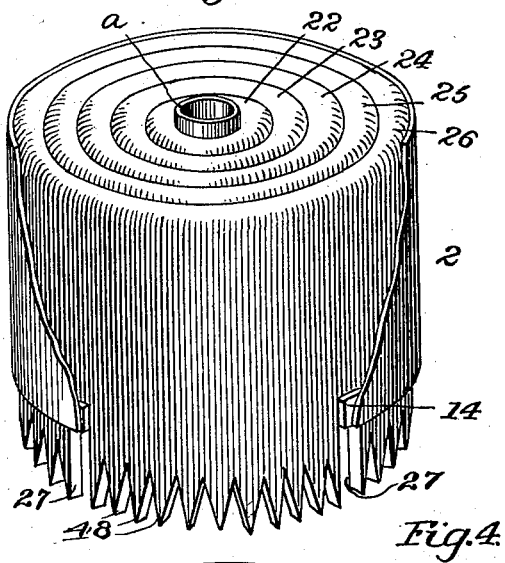
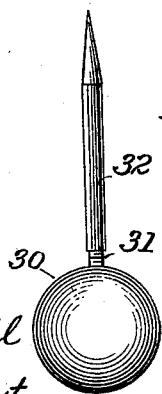
Witnesses
Inventors
W. H. DeWitt
Charles Scudder
By
Watson & Watson
Attorneys

UNITED STATES PATENT OFFICE.

WILLIAM H. DE WITT AND CHARLES SCUDDER, OF SCRANTON, PENNSYLVANIA, ASSIGNORS, BY DIRECT AND MESNE ASSIGNMENTS, TO VICTORY OIL FILTER COMPANY, OF SCRANTON, PENNSYLVANIA, A CORPORATION OF PENNSYLVANIA.

OIL-FILTER.

SPECIFICATION forming part of Letters Patent No. 687,423, dated November 26, 1901.

Application filed January 23, 1901. Serial No. 44,470. (No model.)

*To all whom it may concern:*

Be it known that we, WILLIAM H. DE WITT and CHARLES SCUDDER, citizens of the United States, residing at Scranton, in the county of Lackawanna, State of Pennsylvania, have invented certain new and useful Improvements in Oil-Filters, of which the following is a specification.

The purpose of our invention is to provide an oil-filter compact in form and having a large capacity and in which the filtering operation may be carried on continuously and automatically, the oil being fed to the filtering-compartment in an even manner and only as fast as it can be filtered.

The details and advantages of our improvements will be pointed out in the following specification.

In the accompanying drawings, Figure 1 is a central sectional view through our complete filter, the lower portion being shown in side view. Fig. 2 is a plan view of the filter with the wicks removed. Fig. 3 is a perspective view, partly broken away, of the filter-tanks with the wicks in position. Fig. 4 is a section through the outer casing, taken at the lower end of the filter-tank. Fig. 5 is a detail view of the float-valve which operates within the filter-tank to regulate the supply of oil from the receiving-chamber.

Referring to the drawings, A represents the outer casing of the apparatus, the lower portion 1 of which forms a chamber for the reception of the filtered oil, and within which casing the filter 2 and receiving-tank 3 are arranged, one above the other. As shown, a steam-pipe 4, having cross-arms 5 and 6, extends through the walls of the casing at a suitable distance above the bottom, and this steam-pipe serves as a support for the filtering and receiving tanks. The filter-tank comprises an outer circular wall 7, within which is arranged a series of concentric walls or partitions 8, 9, 10, 11, 12, and 13. These partitions are united and supported by a hollow spider 14, arranged across their lower edges, the arms of said spider being closed at its ends and arranged so that when the filter-tank is placed within the casing the arms of the spider will rest upon the steam-pipe. The central tubular partition 8 is provided with a bottom 15, having a large aperture 16 therein, which opens into the center of the spider 14. The spaces between the partitions 8 and 9, 10 and 11, and 12 and 13 are also closed by bottoms 17, 18, and 19, respectively, each having openings 20, which register with openings in the spider. The filtering-tank is thus divided into a central float-chamber *a*, communicating through the opening 16 with the hollow spider, and concentric filtering-compartments *b*, *c*, and *d*, communicating with the hollow arms of the spider through the openings 20, said oil-chambers being separated from one another by intermediate annular wick-spaces *e*, *f*, and *g*. The hollow arms of the spider thus form an oil conduit or passage-way, through which the several compartments are connected. This oil-conduit is flat or otherwise suitably shaped to rest upon the steam-pipe.

Within each of the filter-compartments *b*, *c*, and *d* is arranged at a suitable distance above the bottom a gauze or perforated partition 21, which partitions form stops for a series of siphon-wicks 22, 23, 24, 25, and 26. These wicks, composed of woven or felted fabric, preferably the latter, are tubular in form and doubled over upon themselves at their upper ends, as shown, the shorter ends of the wicks resting against the perforated partitions within the compartments and the longer ends extending downward through the spaces *e*, *f*, and *g* between the compartments into the upper portion of the clarified-oil chamber 1. Thus the wick 22 extends from the chamber *b* over the partition 9 and downward through the adjoining wick-space *e*. The wicks 23 and 24 extend from the chamber *c* over partitions 10 and 11 and downward through the spaces *e* and *f*, respectively, and the wicks 25 and 26 extend from the chamber *d* over the partitions 12 and 13 and downward through the spaces *f* and *g*. The wicks are slotted at their lower ends, as shown at 27, in order not to interfere with the oil-conduit and steam-pipe arms upon which said conduit rests when the filter is in position within the casing. The lower end of each wick is also notched or serrated, so as to provide a series of tapering points 48, from which the oil will drip more freely than it would if the wicks were cut squarely off.

Within the float-chamber $a$ is arranged a float-valve consisting of a float 30 and a graduated stem 31, upon which is arranged an adjustable pointed sleeve 32, said sleeve being adapted to close the opening of an outlet-pipe 33, which extends through the bottom 34 of the receiving-tank 3. The sleeve is held upon the stem frictionally and is movable thereon for the purpose of regulating the height of oil in the filtering-tank, as will be hereinafter explained. The valve-stem is held in alinement with the opening in the pipe by suitable guides 35. The diameter of the float-chamber is sufficiently greater than that of the float to permit the oil to pass freely down on all sides of the latter.

The receiving-tank 3 consists of a circular vessel adapted to rest upon the top of the filtering-tank and having the outlet-pipe 33 and an inlet-pipe 36. A flexible tube 37 is connected at one end to the outlet-pipe, and the opposite end of the tube is connected to a perforated funnel 38, carried by a float 39. As shown, the inlet-pipe 36 of the receiving-tank extends downwardly on the outside of the tank to a point near the bottom thereof and thence into the tank, and its upper end connects with a funnel 40. The receiving-tank is provided with a drainage-cock 41, by which the accumulated dirt, sludge, and water may be drawn off when desired, and for convenience in inserting and removing the tank from the outer casing said casing is formed with a vertical slot 42, through which the faucet and inlet-pipe may slide when the tank is raised or lowered. The upper end of the slot is suitably widened to receive the funnel 40. A perforated diaphragm 44 extends across the tank a short distance above the bottom, so that when the contents are drawn off the float 39 and funnel 38 will not come in contact with the dirt, &c., in the bottom. The tube 37 extends through a central opening in the diaphragm.

A suitable cover 45 is provided for the casing, and a gage 46 and draw-off cock 47 are fitted to the clarified-oil compartment 1.

In operation steam is admitted to the steam-pipe, and the dirty oil is poured into the receiving-chamber through the funnel 40 and pipe 36. The float 39 rides upon the top of the oil thus poured in, and as the grit and dirt settle to the bottom while the cleaner portion of the oil rises to the top the latter will be continually skimmed from the surface and pass downward through the perforated funnel connected with the float and the flexible tube into the float-valve compartment of the filter-tank. From said compartment the oil passes through the hollow spider or oil-conduit into the surrounding filtering-compartments. As the oil-conduit is continually heated by the steam-pipe on which it rests, the oil flowing through said conduit on its way to the various compartments is heated and made to flow more freely. Whenever the oil in the compartments rises to a short distance above the ends of the wicks, which distance may be regulated by regulating the length of the float-valve stem, the mouth of the pipe leading from the receiving-tank is closed by the valve-stem, thus shutting off the supply of oil to the filter-tank. After the wicks have become soaked by capillary attraction the oil is continuously siphoned out of the several compartments and carried downwardly through the wick-spaces between the compartments and drops off of the pointed ends of the wicks into the clarified-oil chamber. The course of the oil through the wicks is indicated by the arrows in Fig. 1. As the oil flows freely, owing to its heated condition, when entering the compartments and the quantity of wick is very great, the oil is siphoned over quite rapidly.

Whenever the oil in the filter-tank falls below its predetermined height, the float-valve falls and more oil is admitted from the receiving-tank, as will be readily understood, so that the oil in the filter-tank is maintained at a practically constant level around the ends of the wicks. As the filtering is all accomplished in the shorter arms of the wicks, wherein the oil ascends, it is desirable to have the effective length of these arms as long as is consistent with thorough and rapid filtration and to extend the other arms downward far enough to set up a vigorous siphonic action. Under some circumstances—as, for instance, with very heavy oils—it may be desirable to raise the normal height of the oil in the compartments, thus shortening the effective length of the filtering-arms of the wicks, and as the long arms remain the same the siphonic action will be proportionately increased. This may be accomplished by shortening the float-valve stem, so that the oil in the filtering-tank will rise higher before being shut off. Under other conditions it may be desirable to lower the normal height of the liquid for the purpose of increasing the effective length of the filtering-arms of the wicks, as where light free-running oils are to be filtered, and this may be accomplished by increasing the length of the valve-stem. The graduation-marks upon the valve-stem form a convenient guide for adjusting the height of the liquid to suit different grades and conditions.

If the oil should not be drawn off from the clarified-oil chamber when the latter has become filled, the apparatus will cease operating as soon as the clarified oil rises within the wick-spaces to the height of the oil within the compartments of the filter-tank, as both ends of the wicks will then be immersed in oil to the same depth and the siphon action will cease, after which the accumulated oil in the filter-tank will raise the float-valve and cause the supply from the receiving-tank to be cut off. When the clarified oil is drawn off, the filter will commence to operate and continue as before. It will thus be seen that there is no danger of overflowing or mixing the filtered with the unfiltered oil.

The filtering process is greatly facilitated by the serrated form of the lower ends of the wicks, as the oil collects in globules and drops off much quicker than it otherwise would. The heat is applied to the oil at the proper point to make it run freely through the wicks. The wicks may be composed of any material suitable for the purpose, and the apparatus may be constructed with any desired number of filtering compartments and wicks, the compartments being connected by a suitable passage-way.

Instead of having the receiving-tank fitting within the outer casing, as illustrated in Fig. 1, said outer casing may terminate above the filtering-tank and the receiving tank or vessel rest on the upper end of said outer casing. Such a construction would possibly render the removal of the receiving vessel less troublesome than if it were inserted within the outer casing.

Having thus described our invention, what we claim, and desire to secure by Letters Patent of the United States, is—

1. In an oil-filter, the combination of a receiving-tank, a filter-tank, a float within the receiving-tank, a tube connected with the float and arranged to conduct oil from the receiving-tank to the filter-tank, a float-valve within the filter-tank arranged to control the flow of oil through said tube, and a wick arranged to siphon oil out of said filter-tank.

2. In an oil-filter, the combination of a receiving-tank, a filter-tank, a passage leading from the receiving-tank to the filter-tank, a float within the receiving-tank, a tube connecting said float with said passage and adapted to receive oil at its upper end and conduct it to the passage, a float-valve within the filter-tank arranged to control the flow of oil through said passage, and a wick arranged to siphon oil out of said filter-tank.

3. In an oil-filter, the combination of a receiving-tank, a filter-tank, a float within the receiving-tank, a tube connected with the float and arranged to conduct oil from the receiving-tank to the filter-tank, a float-valve within the filter-tank arranged to control the flow of oil through said tube, a wick arranged to siphon oil out of said filter-tank, and means for heating the oil in said filter-tank.

4. An oil-filter comprising a series of filtering-compartments separated from one another by intermediate spaces, wicks extending from the interior of said compartments into said spaces, and a conduit or passage-way communicating with the several compartments and adapted to convey oil to said compartments.

5. An oil-filter comprising a series of annular filtering-compartments separated from one another by intermediate spaces, wicks extending from the interior of said compartments into said spaces, and a conduit or passage-way communicating with the several compartments and adapted to convey oil to said compartments.

6. An oil-filter comprising a series of filtering-compartments separated from one another by intermediate spaces, wicks extending from the interior of said compartments into said spaces, a passage-way communicating with the several compartments and adapted to convey oil to said compartments, and means for heating said passage-way.

7. An oil-filter comprising a series of annular filtering-compartments separated from one another by intermediate spaces, wicks extending from the interior of said compartments into said spaces, and means for heating the oil in said compartments.

8. In an oil-filter, the combination with a receiving-tank having an outlet-opening, of a filter-tank having a float-valve therein adapted to close said opening, a series of filtering-compartments separated from one another by intermediate spaces, a communicating conduit or passage-way between said filtering-compartments, and wicks extending from the interior of the filtering-compartments into the intermediate spaces.

9. In an oil-filter, the combination with a receiving-tank having an outlet-opening, of a filter-tank having a float-compartment, a float-valve therein adapted to close said opening, a series of annular filtering-compartments separated from one another by intermediate spaces, a communicating conduit or passage-way between said float-compartment and filtering-compartments, and wicks extending from the interior of the filtering-compartments into the intermediate spaces.

10. In an oil-filter, the combination with a receiving-tank having an outlet-opening, of a filtering-tank having a float-valve therein adapted to close said opening, said float-valve having an extensible stem, whereby the height of the oil in the filtering-compartment may be regulated.

11. In an oil-filter, a filter-tank and a wick composed of woven or felted fabric arranged to siphon the oil out of said tank, said wick having its end without the tank notched or serrated.

12. In an oil-filter, a filter-tank comprising a series of compartments separated from one another by intermediate spaces, and a series of wicks composed of woven or felted fabric arranged to siphon the oil out of said compartments, said wicks having their ends which lie without the compartments notched or serrated.

13. In an oil-filter the combination with a receiving-tank having an outlet-opening, of a filter-tank having a central float-compartment and a float-valve therein adapted to close said opening, a series of surrounding filtering-compartments separated from one another by intermediate spaces, a conduit connecting the lower ends of said filtering-compartments with the float-compartment, and wicks extending from the interior of the filtering-compartments over the walls thereof and into the intermediate spaces.

14. In an oil-filter the combination with a receiving-tank having an outlet-opening, of a filter comprising a central float-compartment having a float-valve therein adapted to close said opening, a series of surrounding filtering-compartments separated from one another by intermediate spaces, a conduit connecting the lower ends of said filtering-compartments with the float-compartment, means for heating said conduit, and wicks extending from the interior of the wick-compartments over the walls thereof and into the intermediate spaces.

15. In an oil-filter the combination with a receiving-tank having an outlet-opening, of a filter-tank having a central float-compartment, a float-valve in said compartment adapted to close said opening, said float-valve having an extensible stem, a series of surrounding filtering-compartments separated from one another by intermediate spaces, a conduit connecting the lower ends of said filtering-compartments with the float-compartment, and wicks extending from the interior of the filtering-compartments over the walls thereof and into the intermediate spaces.

16. In an oil-filter the combination with a receiving-tank having an outlet, of a filter-tank having a central float-compartment and a float-valve therein adapted to close said opening, a series of surrounding filtering-compartments separated from one another by intermediate spaces, a conduit connecting the lower ends of said filtering-compartments with the float-compartment, and wicks extending from the interior of the filter-compartments over the walls thereof and into the intermediate spaces, the lower ends of said wicks being notched or serrated.

17. In an oil-filter the combination with a receiving-tank having an outlet-opening, and a filter comprising a central float-compartment having a float-valve therein adapted to close said opening, a series of surrounding filtering-compartments separated from one another by intermediate spaces, a conduit connecting the lower ends of said filtering-compartments with the float-compartment, and wicks extending from the interior of the filtering-compartments over the walls thereof and into the intermediate spaces, of a casing within which said receiving-tank and filter are arranged, and a steam-pipe extending transversely through said casing in contact with said conduit, said pipe forming a support for the tank and filter.

18. In an oil-filter the combination with a receiving-tank having therein a perforated diaphragm raised above the bottom of the tank, a float having a funnel attached thereto, an outlet-opening in the bottom of the tank and a flexible tube connecting said funnel with said opening, of a filter-tank having a central float-compartment and a float-valve therein adapted to close said opening, a series of surrounding filtering-compartments separated from one another by intermediate spaces, a conduit connecting the lower ends of said filtering-compartments with the float-compartment, and wicks extending from the interior of the filtering-compartments over the walls thereof and into the intermediate spaces.

19. In an oil-filter, the combination of a receiving-tank, a filter-tank, a passage leading from the receiving-tank to the filter-tank, a float within the receiving-tank, a tube connecting said float with said passage and adapted to receive oil at its upper end and conduct it to the passage, a float-valve within the filter-tank arranged to control the flow of oil through said passage, said filter-tank having a series of communicating compartments, and a series of wicks arranged to siphon the oil from said compartments.

20. In an oil-filter, the combination with a filtering-tank, of a receiving-tank having a passage-way leading through the bottom thereof to said filtering-tank, a float within the receiving-tank, a tube connected with the float and arranged to conduct oil to said passage-way, and a perforated diaphragm above the bottom of the receiving-tank, for the purpose set forth.

In testimony whereof we affix our signatures in presence of witnesses.

WM. H. DE WITT.
CHAS. SCUDDER.

Witnesses as to Wm. H. De Witt:
JOHN P. BUTLER,
JENKIN LEWIS.

Witnesses as to Chas. Scudder:
CHAS. L. PATTERSON,
JOHN H. LINDSAY.